UNITED STATES PATENT OFFICE.

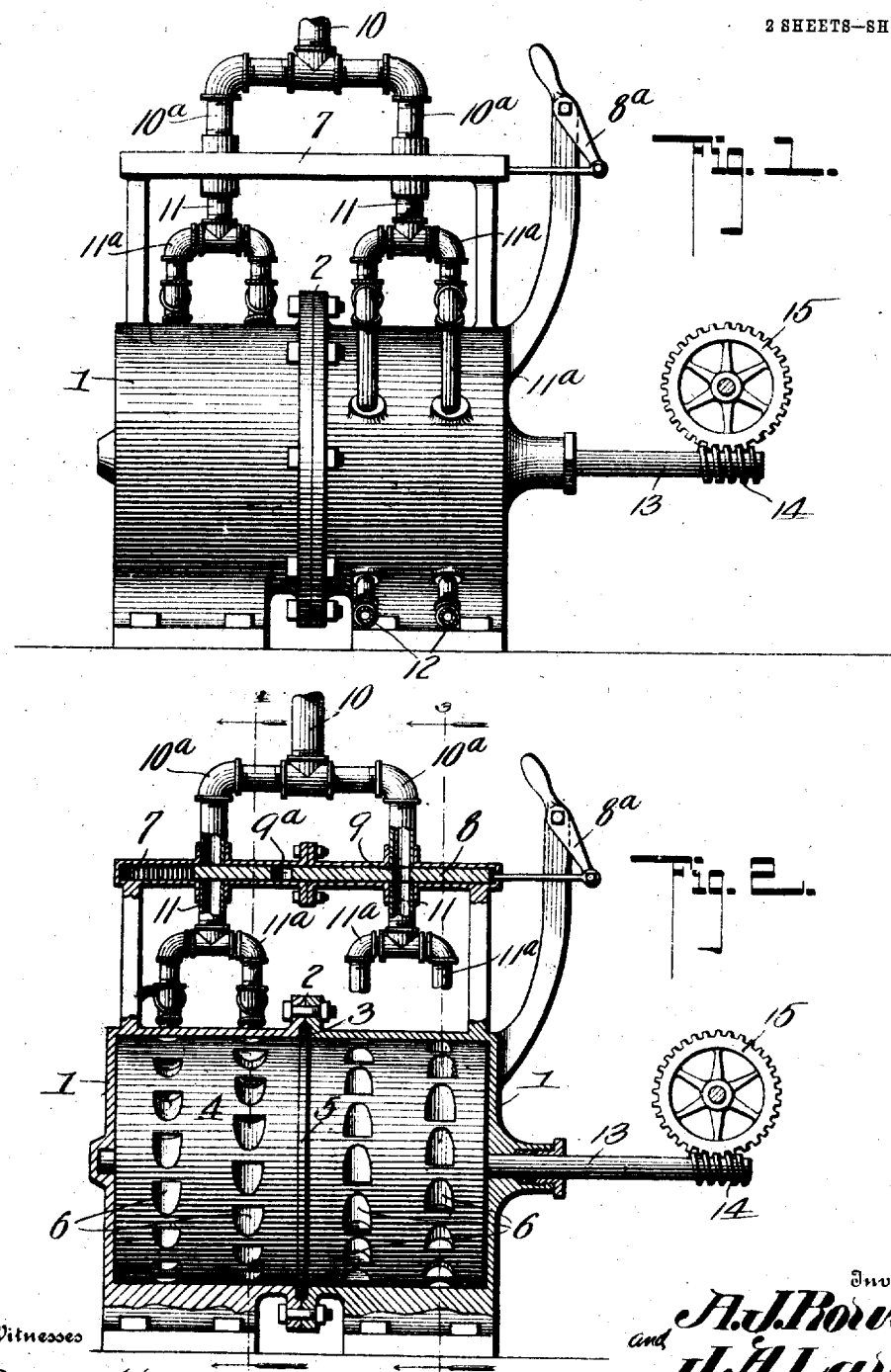

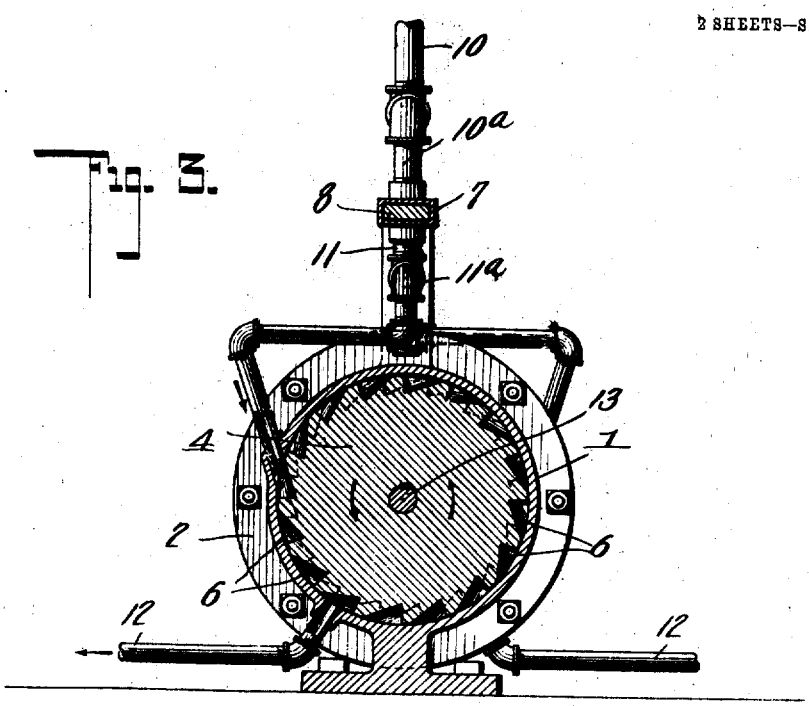
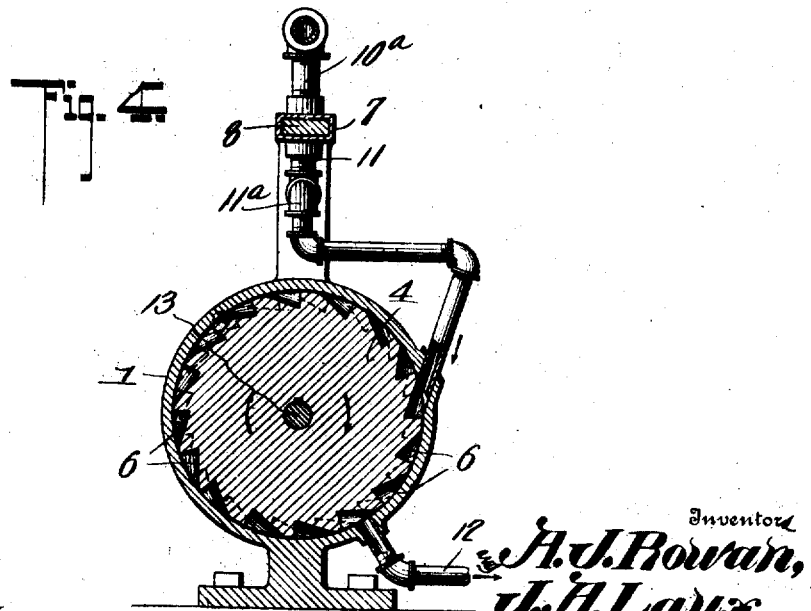

ANDREW J. ROWAN AND JOHN A. LAUX, OF TREMONT, PENNSYLVANIA.

TURBINE.

No. 901,385.  Specification of Letters Patent.  Patented Oct. 20, 1908.

Application filed January 30, 1908. Serial No. 413,445.

*To all whom it may concern:*

Be it known that we, ANDREW J. ROWAN and JOHN A. LAUX, residing at Tremont, in the county of Schuylkill and State of Pennsylvania, have invented a new and useful Improvement in Turbines, of which the following is a specification.

This invention relates to a turbine and has for its object a device of this kind driven by impact of steam delivered into staggered pockets.

The object of this invention is an engine of this type which shall be very simple in construction, with very few parts and those of a durable nature and which if desired can be employed in any position and is also especially adapted for use in connection with motor driven vehicles.

The invention consists of the novel features of construction hereinafter described, pointed out in the claims and shown in the accompanying drawings in which Figure 1 is a side elevation. Fig. 2 is a sectional elevation. Fig. 3 is a transverse section on the line 3—3 of Fig. 2. Fig. 4 is a section on the line 4—4 of Fig. 2.

In constructing our engine we employ two flanged cylinders 1 which may or may not be provided with a bed-plate, according to the manner of use of the engine, and the flanges 2 of these cylinders are bolted together and are also recessed as shown at 3 for a purpose which will appear later.

Within the cylinder formed by the two cylindrical sections above described we place a solid piston 4 which is divided into two sections by a circumferential rib 5 formed midway its ends, which rib fits in and rotates within the recess 3. This rib forms a packing and prevents creeping of any steam between the surfaces of the piston 4 and the inner face of the cylinder. Upon the piston 4 on each side of the rib 5 we form in the piston a set of staggered pockets 6 the two sets being oppositely arranged, thereby providing for the ready reversal of the turbine. These pockets have straight walls at their forward ends and are rounded at their rear ends, and are cut so as to gradually deepen from rear to front. Each set consists of two rows arranged circumferentially about the piston, the pockets of one row overlapping those of the other.

A valve casing 7 is supported by the cylinder 1 and arranged in the same is an ordinary slide valve 8 provided with openings 9 and 9ª. A steam supply pipe 10 is provided with branches 10ª which aline respectively with pipes 11 provided with branches 11ª. The pipes 10ª and 11 open in alinement with each other upon opposite sides of the valve casing 7, and the openings 9 and 9ª are so arranged that when the opening 9 registers with two of the said pipes the opening 9ª is out of alinement with the other pipes 10ª and 11 and the valve 8 prevents communication between them. By shifting the valve by means of a suitable lever 8ª steam may be admitted to either of the pipes 11 and consequently to either set of pockets. The pipes 11ª carried by one pipe 11 open respectively into the pockets of one set, and upon one side of the cylinder and the pipes 11ª carried by the other pipe 11 open upon the opposite side of the casing into the oppositely arranged pockets of the other set.

The direction of rotation of the engine will depend upon the set of pockets into which the steam is admitted. Suitable exhaust pipes 12 are provided for each set of pockets. These pipes are so arranged that steam received by any pocket will be carried only about one-eighth of a revolution about the piston shaft 13 and will then be exhausted. The shaft 13 is provided with a worm gear 14 which meshes with a gear 15. Or power may be taken from the shaft 13 in any other desired manner.

It will be noted from the construction of the pockets that they present at their rear no radial wall against which the steam can kick back, also that dead steam is not carried a long distance around the shaft but is exhausted within about one-eighth of a revolution, the impact of the steam only being made use of. It will also be noted that by overlapping the pockets a pocket in one row will receive an impact and commence to fill with steam before a pocket in the same set but in the other row has cleared the pipe 11ª discharging steam into it. By this means a continuous steam pressure is kept upon the piston and it is not necessary to depend upon momentum to bring the pockets into registry.

Having thus fully described our invention, what we claim as new and desire to secure by Letters Patent, is:—

1. A device of the kind described comprising a cylinder, a piston fitting closely therein and extending the full length of the cylinder, pockets formed in sets of two rows each being produced upon the surface of the piston, the said sets being oppositely arranged, the pockets of each set being formed in parallel rows and staggered with respect to each other, means for admitting steam to pockets of both rows of a set at the same time, and means for exhausting steam from said pockets when the piston has made approximately one-eighth of a revolution.

2. A turbine consisting of a cylinder formed in two sections, the said sections being flanged and bolted together, an annular recess being formed in said flanges, a piston fitting in and extending the full length of the cylinder, a rib carried by said piston, said rib fitting in the recess above mentioned, oppositely arranged pockets formed upon the piston on opposite sides of the rib, and means for admitting steam to and exhausting steam from either set of said pockets.

ANDREW J. ROWAN.
JOHN A. LAUX.

Witnesses:
HARRY O. HAAG
W. J. DOYLE.